(12) United States Patent  (10) Patent No.: US 8,774,540 B2
Wan et al.  (45) Date of Patent: Jul. 8, 2014

(54) TILE SUPPORT IN DECODERS

(75) Inventors: Wade Wan, Orange, CA (US); Tim Hellman, Concord, MA (US); Waqer Ahmad, Andover, MA (US)

(73) Assignee: Broadcom Corporation, Irvine, CA (US)

( * ) Notice: Subject to any disclaimer, the term of this patent is extended or adjusted under 35 U.S.C. 154(b) by 142 days.

(21) Appl. No.: 13/569,821

(22) Filed: Aug. 8, 2012

(65) Prior Publication Data

US 2013/0279817 A1  Oct. 24, 2013

Related U.S. Application Data

(60) Provisional application No. 61/636,232, filed on Apr. 20, 2012.

(51) Int. Cl.
*G06K 9/36* (2006.01)
*G06K 9/46* (2006.01)

(52) U.S. Cl.
USPC .......................................................... 382/233

(58) Field of Classification Search
USPC ................. 382/164, 173, 232, 233, 244–246; 375/240.08, E07.027; 341/50, 51
See application file for complete search history.

(56) References Cited

U.S. PATENT DOCUMENTS

| | | | |
|---|---|---|---|
| 6,141,446 A * | 10/2000 | Boliek et al. | 382/233 |
| 6,549,666 B1 * | 4/2003 | Schwartz | 382/233 |
| 6,570,510 B2 * | 5/2003 | Chen et al. | 341/51 |
| 6,664,902 B2 * | 12/2003 | Andrew et al. | 341/50 |
| 2012/0230399 A1 * | 9/2012 | Segall et al. | 375/240.08 |
| 2013/0279817 A1 * | 10/2013 | Wan et al. | 382/233 |

* cited by examiner

*Primary Examiner* — Amir Alavi
(74) *Attorney, Agent, or Firm* — Brinks Gilson & Lione

(57) ABSTRACT

A method and system for decoding an image having a plurality of tiles is provided. The system performs entropy decoding of bit information to generate bin information where the bin information is in tile order. The system converts the bin information from tile order to raster order. Then the system performs symbol decoding of the bin information in raster order.

20 Claims, 9 Drawing Sheets

TILE SUPPORT IN DECODERS

CROSS REFERENCE TO RELATED APPLICATIONS

This application is a non-provisional of and claims the benefit of U.S. Provisional Patent Application No. 61/636,232 filed Apr. 20, 2012, entitled "Tile Support In Decoders" the content of which is hereby incorporated by reference in its entirety.

TECHNICAL FIELD

This disclosure relates to a system and method for decoding.

BACKGROUND

As the demand for increased quality in multimedia transmissions grows, industry continuously provides more complex video and audio formats. To efficiently process these complex formats, significant development may be required in terms of processing techniques and architecture.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The High Efficiency Video Coding (HEVC) standard introduces the concept of subdividing a video image into rectangular regions called tiles. Each tile region is independent of others, but boundaries between tiles can be filtered with the standard in-loop filters: deblocking, sample adaptive offset (SAO) and adaptive loop filter (ALF). Decoding tiles in stream order would therefore require either a second pass through pixel memory to do the filtering, or a significant amount of on-chip buffering. It is therefore desirable to convert such streams into a form which can be decoded in raster order. Doing so allows the non-tile front and back-end decoder hardware to operate virtually unchanged.

In the HEVC decoder, the entropy decoder such as a context adaptive binary arithmetic coding (CABAC) block operates on the bit stream well ahead of the rest of the pipeline, which affords the opportunity to do the conversion from tile order to raster order. Certain new configurations are required to accommodate the conversions and complications may be introduced by having slices within tiles.

Tiles are a method of dividing an image into rectangular regions. A tiled image may have an arbitrary number of rows and columns of tiles. Each tile may consist of an integral number of largest coding units (LCUs). Every tile in the same row may have the same LCU height, and every tile in the same column may have the same LCU width. LCUs in tiles may be encoded in raster order within a tile, and tiles themselves may also processed in raster order. Slices are distinct regions that may be in raster order within one or more tiles.

Figure 1:
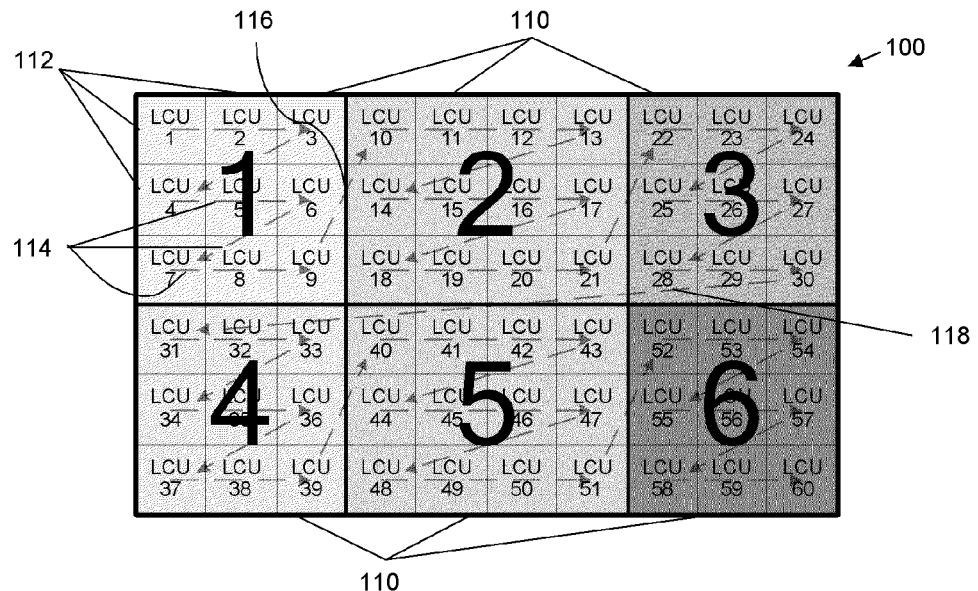
FIG. 1 is a six tile image with the encoding order indicated.

FIG. 1 is an illustration of an image including six tiles 110. Each tile is a subdivision of the image. Each tile 110 is includes one or more LCUs 112. An LCU may be defined as a square pixel region used to divide a picture. Each LCU can be further sub-divided into coding units. A typical image would be processed across a row of the entire image in raster order and then the subsequent row scanned, and so on. However, the system may be implemented such that the LCUs in tiles are encoded in raster order within a tile, as denoted by line 114. Further, the tiles themselves are also processed in raster order, as denoted by lines 116 and 118. As such, LCU 1 is processed then LCU 2, then LCU 3 until the end of the tile is reached then the next row including LCU 4, LCU 5, and LCU 6 are processed and so on. Similar to the LCUs, the first tile, second tile, and third tile are processed in order, then the next row of the fourth, fifth, and sixth tile are processed, as denoted by arrow 118.

Figure 2:
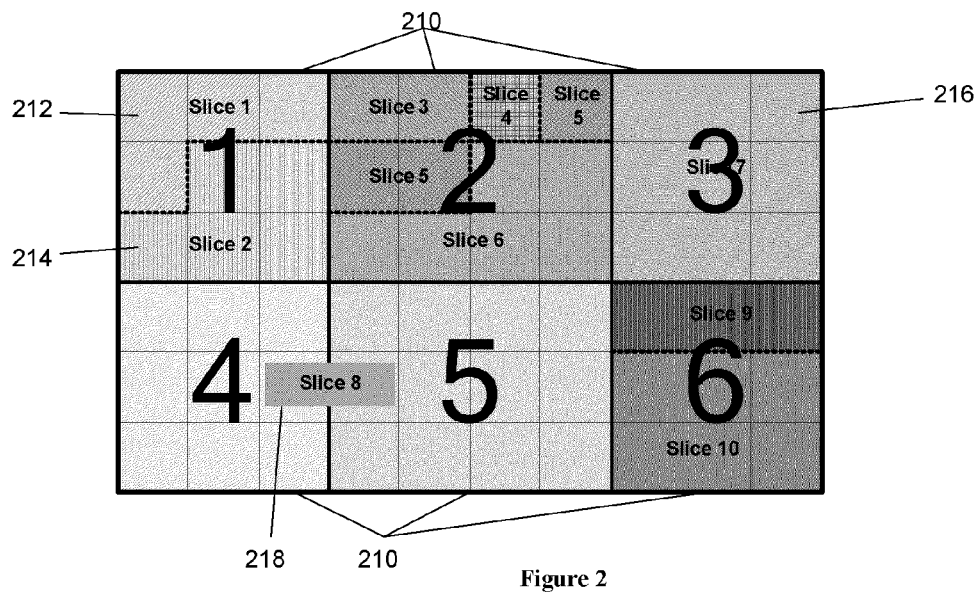
FIG. 2 is an illustration of an image having both tiles and slices.

Tiles and slices can coexist. Generally, a tile includes of an integral number of slices or a slice includes of an integral number of tiles. Now referring to FIG. 2, an illustration of an image having both tiles and slices is provided. The tiles 210 are illustrated in the same manner as FIG. 1. The slices can coexist with tiles but provide a different grouping of the LCUs. For example, a first slice 212 and a second slice 214 are both included in and divide the first tile. Similarly, the second tile is divided into multiple slices. Each slice includes a one or more LCUs. The third tile corresponds to the seventh slice such that all the LCUs in the third tile are also in the seventh slice. Accordingly, the LCUs contained in the third tile and the seventh slice are equal. Further, a slice, such as the eighth slice, as denoted by reference number 218, may extend across and include multiple tiles. For example, the eighth slice includes all the LCUs in the fourth tile and the fifth tile. While FIG. 2 is exemplary, various other configurations of slices and tiles may be provided.

Figure 3:
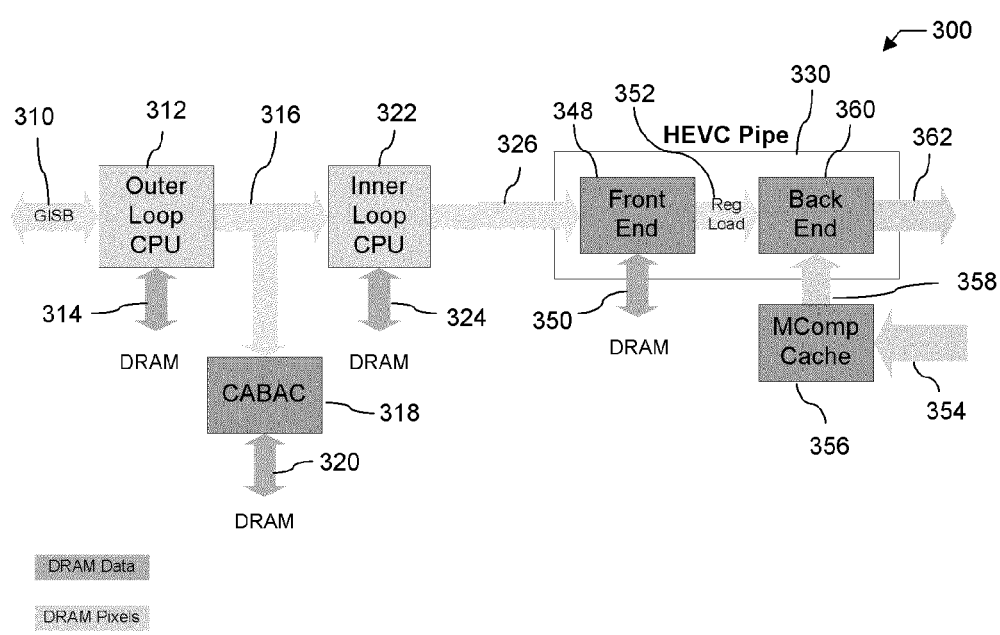
FIG. 3 is a block diagram of a HEVC decoder.

Now referring to FIG. 3, a block diagram of an HEVC decoder is provided. There are two CPUs (outer and inner loop), entropy decoder, and a pixel pipeline with a front-end for symbol decoding, and a back-end for pixel processing. The entropy encoder for the examples provided in this application will be referred to as a CABAC engine, however, it is understood that other entropy decoding techniques could also be used within similar architectures. An input 310, such as a register bus input from a controller, is received by the outer loop CPU 312. The outer loop CPU 312 may access DRAM data, as denoted by line 314. The outer loop may provide a processing output to the inner loop 322 and the CABAC engine 318, as denoted by line 316. The CABAC engine 318 may access DRAM data, as denoted by line 320. The inner loop CPU 322 may also access DRAM data, as denoted by line 324. The inner loop CPU 322 provides an output 326 to the front end 348 of the pipe 330.

Similarly, the front end 348 of the pipe 330 may process the output of the inner loop CPU 332. The front end 348 may also be in communication with DRAM for the communication of DRAM data, as denoted by line 350. The front end 348 may provide an output 352 to the back end 360 of the pipe 330. An input 354 is provided to the motion compensation cache 356. The motion compensation cache 356 provides motion compensation output data to the back end 360, as denoted by line 358. The back end may then process the output from the front end 348 and the output from the motion compensation cache 356 to generate an output 362 that may then be provided to DRAM or a display engine. While the above description, discusses separate inner and outer loop CPUs, multiple threads on the same CPU could also be used.

Figure 4:
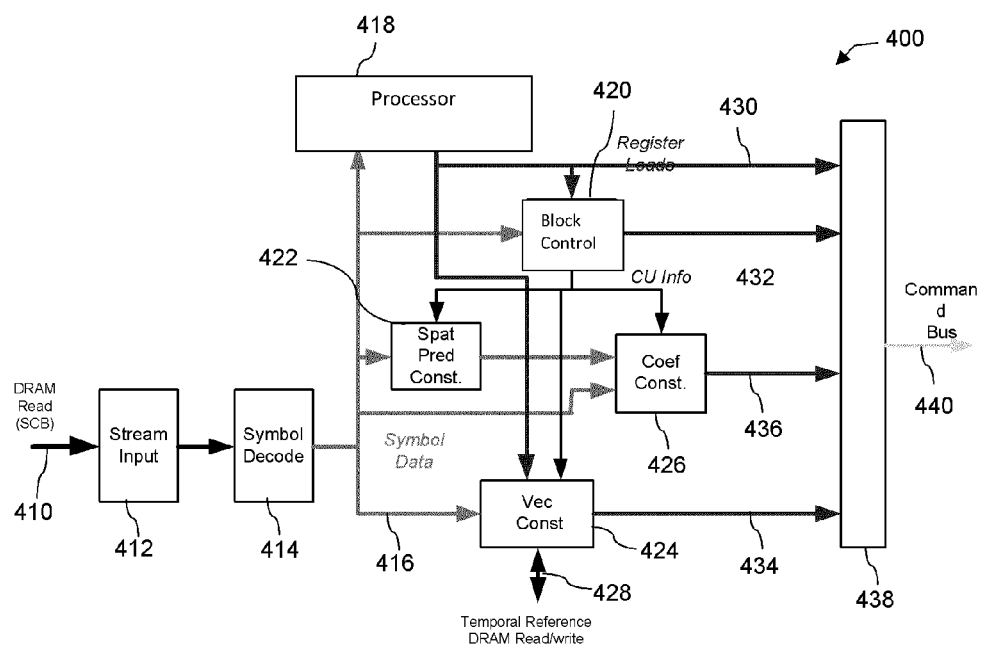
FIG. 4 is a block diagram of a front end symbol decoder.

Now referring to FIG. 4, a block diagram of a front end symbol decoder is provided. The front end 400 receives a DRAM read 410 into the stream input 412. The stream input results are provided to the symbol decode block 414. The symbol decode block provides symbol data to an inner loop and slice block 418, a block control 420, a spatial prediction constructor 422, a coefficient constructor 426, and a vector constructor 424, as denoted by line 416. The inner loop and slice block 418 provides register leads to the vector constructor 424, the block control 420, and the command block 438, as denoted by line 430. The block control 420 processes the register leads and the symbol data and then provides coding unit information 432 to the spatial prediction constructor 422, the coefficient constructor 426, and the vector constructor 424. The block control 420 also provides an output to the command block 430, for example, registered lead data. The spatial prediction constructor 422 processes the symbol data and the coding unit information 432 and then generates an output, such as a symbol data output, to the coefficient constructor 426.

The coefficient constructor 426 processes the coding unit information 432, the symbol data 416 from the symbol decode block 414, and the output from the spatial prediction constructor 422 to generate an output 436, for example register data that is provided to the command block 438. The vector constructor 424 is in communication with a DRAM, as denoted by line 428, for example, to access a temporal reference. As such, the vector constructor 424 may utilize the information retrieved from the DRAM, the symbol data 416 from the single decode block 414, the registered lead data 430 from the inner loop and slice block 418, and the coding unit information 432 from the block control 420 to generate an output 434 that is provided to the switch 438. The switch 438 may combine the output from the vector constructor 424, the output from the coefficient constructor 426, the output from the block control 420, and the output from the inner loop and slice block 418 to generate a command output 440.

Figure 5:
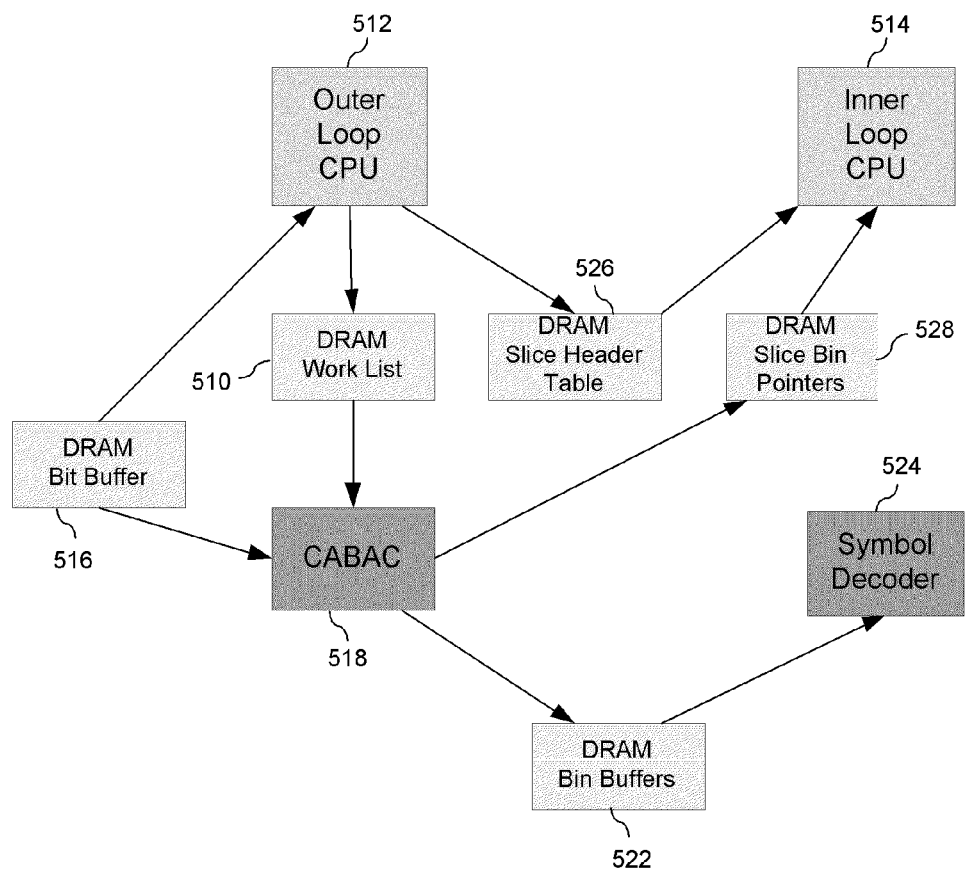
FIG. 5 is an illustration of the data and control flow for a non-tile image.

FIG. 5 illustrates the data and control flow for a non-tile image. Generally, the bit buffer in DRAM contains the coded data. The outer loop reads the bit buffer to parse the slice headers, which contain slice-specific parameters. The outer loop then builds a work list for the CABAC engine, and deposits the slice parameters into a table in DRAM.

The DRAM bit buffer provides bit information to the outer loop CPU 512 and the CABAC engine 518. The outer loop CPU processes the bit information and generates a DRAM work list, as denoted by reference numeral 510. The CABAC engine 518 receives the DRAM work list 510 and generates DRAM bin buffers 522. For example, the CABAC engine 518 may parse the work list, read slice data from the bit buffer and decode the slice data into bin data, which the CABAC engine deposits into DRAM. There may be one bin buffer per slice. The CABAC engine 518 may also create a table of pointers to the bin buffers in DRAM 528.

A symbol decoder 524 receives the DRAM bin buffers 522 to generate symbol data. In addition, the CABAC engine 518 generates DRAM slice bin pointers, as denoted by block 528.

The outer loop CPU 512 also generates a DRAM slice header table 526 based on the bit information. The inner loop CPU 514 receives the DRAM slice header table 526 and the DRAM slice bin pointers 528 for decoding purposes. For example, the inner loop CPU may read the slice header table and the bin pointer table, and use the information to program the symbol decoder to fetch the bin data and start decoding the bin data. Further, the CABAC engine may be permitted to run far ahead of the inner loop CPU/Symbol decoder, to maximize the parallelization between the two.

In one example, an image consisting of four slices may cause the CABAC engine to generate 4 bin buffers, each of which is physically contiguous but separate from the other buffers. The buffers may be variable in size. The CABAC engine may also generate a table of pointers to those buffers. Likewise, the outer loop processor may produce a table of slice parameter data. Each entry in this table can be identically sized, as they can be sized to fit the largest possible set of slice parameters.

Figure 6:
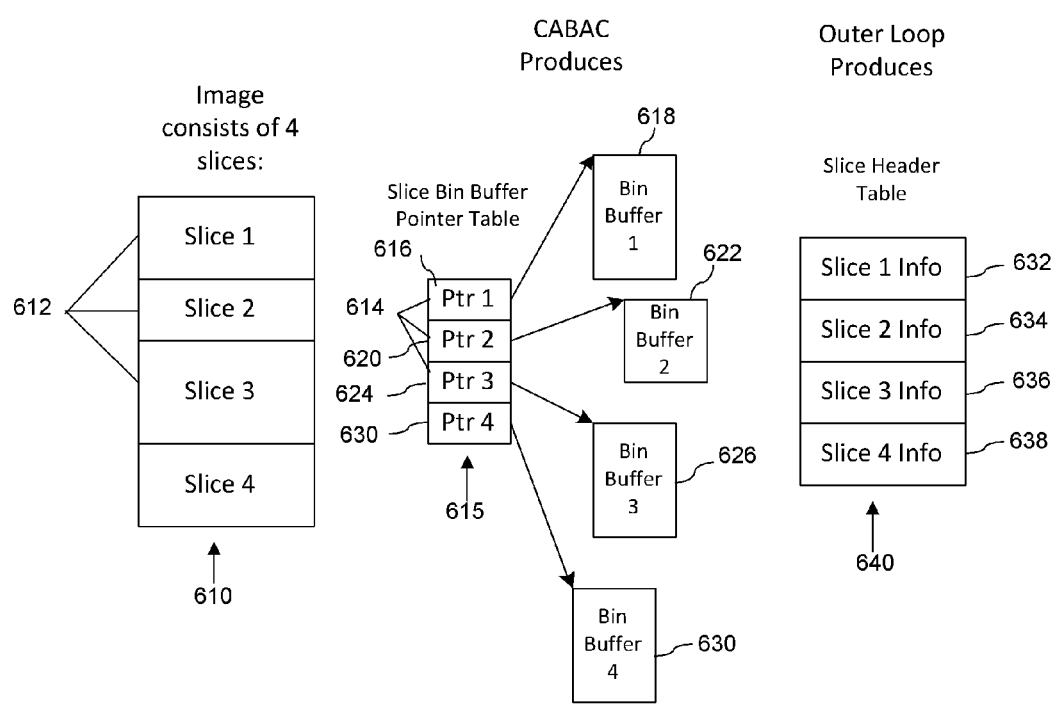
FIG. 6 is an illustration of a memory structure for processing slices.

Now referring to FIG. 6, a memory structure for processing slices is illustrated. The image 610 includes four slices, denoted by reference numeral 612. The slice bin buffer pointer table 615 is produced by the CABAC engine. The slice bin buffer pointer table 615 includes a number of pointers 614 corresponding to the number of slices. Accordingly, the slice bin buffer pointer table 615 includes four pointers, such as a first pointer 616, second pointer 620, a third pointer 624 and a fourth pointer 628. The first pointer 616 corresponds to a first bin buffer 618. The second pointer 620 corresponds to a second bin buffer 622. Similarly, a third pointer 624 corresponds to a third bin buffer 628, while a fourth pointer 628 corresponds to a fourth bin buffer 630. The information for each slice 632, 634, 636, and 638 is contained in a slice header table 640. The slice header table 640 is produced by the outer loop CPU.

In some instances, it may be desirable to convert from tile to raster order. To accomplish the conversion, the concept of tile rows may be introduced. A tile row is a single row of LCUs that span the width of a tile. Here, a tile row may be referenced by its tile number and its row letter.

Figure 7:
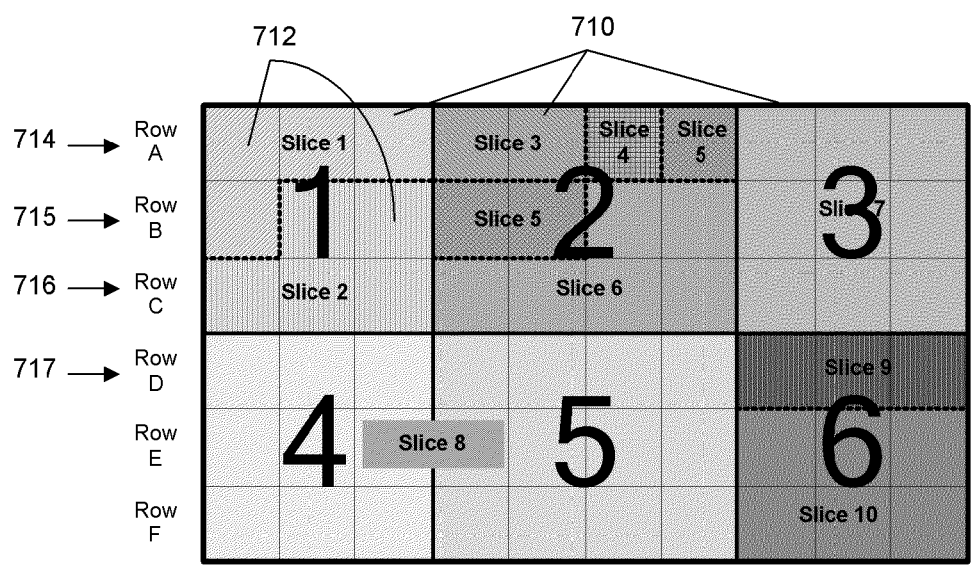
FIG. 7 is an illustration of an image having tile rows assigned.

Now referring to FIG. 7, an illustration of an image having assigned tile rows is provided. The image includes a plurality of tiles 710 similar to FIG. 1. Further, the image also includes a plurality of slices 712 similar to FIG. 2. In addition, a number of tile rows, for example row A as denoted by reference numeral 714, row B as denoted by reference numeral 715, row C as denoted by reference numeral 716, and row D as denoted by reference numeral 717, are defined. So, in FIG. 7, tile row 1A consists of the first three LCUs in the first tile. Likewise, tile row 5E consists of the middle four LCUs in the fifth tile. The number of tile rows may be known in advance of picture decoding; by the equation: tile_rows=picture_height_in_lcus*number_of_tile_columns.

Figure 8:
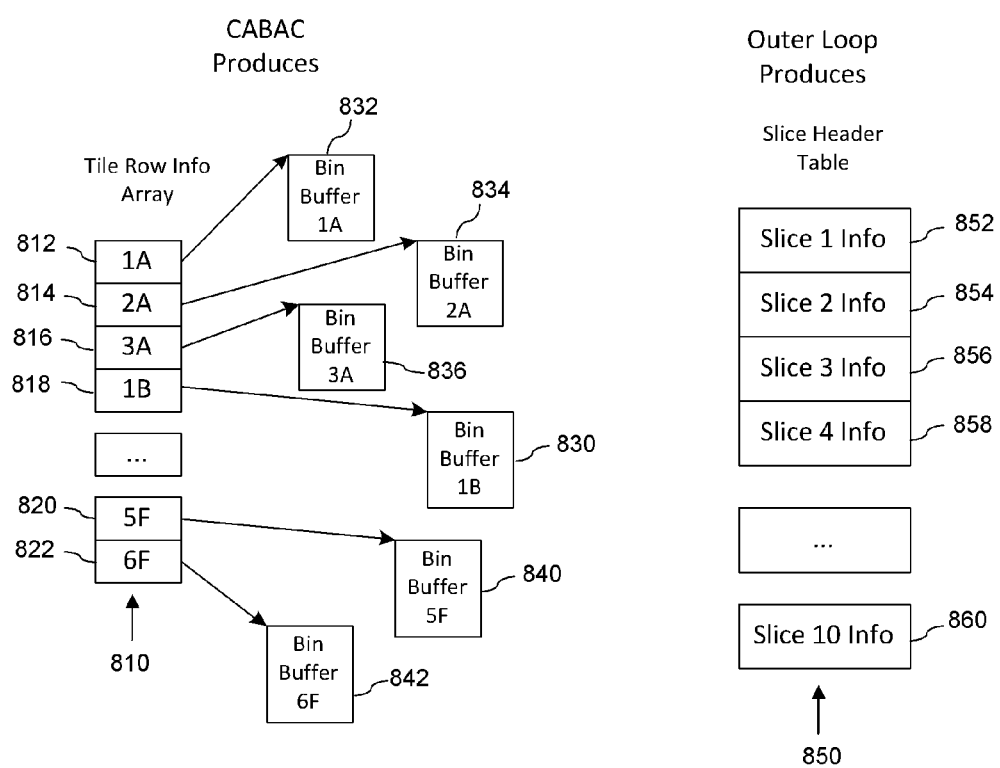
FIG. 8 is an illustration of a memory structure for tile decoding.

The tile to raster order conversion may be accomplished by changing the outputs of the CABAC engine. Instead of outputting a slice pointer table and slice bin buffers, in tile mode the CABAC engine outputs a tile row info array and tile row bin buffers. The slice header information from the outer loop may be stored as before. An example image is provided in FIG. 7, while the data structures are as shown in FIG. 8. In addition, non-tiled images can also be accommodated with this technique by assigning one tile row per image row.

The tile row info array contains more than just a buffer pointer. It needs to contain all the information necessary for the inner loop to decode the tile row. The full set of information may include:

Pointer to the start of the tile row bin buffer

Length of the tile row bin buffer
Slice number of the first LCU in the tile row
Slice number of the last LCU in the tile row (may be the same as the first)
Error indicator All of this information may be used for the inner loop CPU to switch between tile rows, as will be shown. The CABAC engine outputs a new tile row entry every time it reaches the end of a tile row. The table 810 is arranged in raster order, so the CABAC engine tile row array output may be non-contiguous. For example, the CABAC engine may decode all of the first tile before it gets to the second tile, in which case the CABAC engine writes entries in this order: 1A, 1B, 1C, 2A, 2B, etc.

The inner loop CPU processes through the tile row info array sequentially. For efficient processing, the inner loop CPU may program the symbol decoder DMA to fetch the next tile row while the present tile row is being processed. The inner loop CPU can easily accomplish this, since the pointer to and length of the next bin buffer to be processed may be located in the entry immediately after the present one.

The inner loop CPU also has to fetch slice information from the slice header table 850 in DRAM. This may involve programming a direct memory access controller (DMA). For non-tiled images this is easy, as the slices are processed sequentially. Here, however, the slice order is non-sequential. In the example, decoding the first image row involves fetching slice data for slice 1, 3, 4, 5, and 7, and then 1, 2, 5, 6 and 7 for the next image row. This is why it may beneficial to include the starting and ending slice numbers in the tile row info array. From the starting and ending slice numbers the inner loop CPU can deduce the slice data DMA sequence for the row, and program the DMA accordingly. Determining the pointer to the start of the slice info entry is also easy, as the info entries are a fixed size. The end of each tile row is treated as a slice boundary, and slice boundaries within a tile row are encountered and processed in the usual manner.

The rough pseudo-code for this operation is provided below:

```
foreach tile_row {
        if (error in tile_row) { conceal_row( ); continue; }
        ProgramSymbolDecodeDMA(tile_row_ptr,
            tile_row_len)
        foreach slice in tile_row {
                DmaIn(slice_header_base + (slice_num *
slice_header_size), slice_header_size)
                    Load slice parameters into pipeline
                    Decode to end of slice or end of tile row
        }
}
```

This pseudo-code is only intended to illustrate the sequence. For clarity, the pseudo-code above does not "fetch ahead" the DMA data, something that maybe beneficial in real operation for full performance.

The pseudo code determines if an error is identified in the tile row. If an error is identified in the tile row, the row is concealed and not displayed. If an error does not exist in the tile row, the symbol is decoded for the current tile row. Then, the memory is read for the current slice, the parameters for the current slice is loaded into the pipeline, and the data is decoded to the end of the slice or the end of a tile row. Each slice in the tile row is read, loaded, and decoded as described above. This entire process is repeated for each tile row.

Some decode states such as the quantization parameter (QP) may need to be held from one image row to the next in the same slice. Such decode states can be stored locally in an array in the construction logic. The size of such an array is defined by the maximum number of tile columns, which is typically limited to a small number.

With tile decoding, the decode pipeline may wait until the entire picture has been CABAC decoded. In other implementations, the decode pipeline may start earlier when sufficient data is available.

For non-tile images, an error in a slice can be detected by the CABAC engine and signaled in the slice pointer table. In the described scenario, a slice can encompass multiple tile rows, so the CABAC engine may have to go back and mark all the array entries of that slice with an error flag. Also, a bad slice within a tile row can cause the entire tile row to be marked as bad, since there is no separate slice-level error indication.

Now referring to FIG. 8, an illustration of the memory structures for tile decoding is provided. A tile row information array 810 is produced by the CABAC. A tile row information array 810 includes element 812 corresponding to the first tile of row A, 814 corresponding to the second tile of row A, 816 corresponding to the third tile of row A, 818 corresponding to the first tile of row B and so forth down to reference numeral 820 and 822 corresponding to the fifth tile of row F and the sixth tile of row F, respectively, for this example. Accordingly, each element of the tile row information array corresponds to a bin buffer. For example, element 812 corresponds to bin buffer 832, element 814 corresponds to bin buffer 834, element 816 corresponds to bin buffer 836, element 818 corresponds to bin buffer 838, element 820 corresponds to bin buffer 840, element 842 corresponds to bin buffer 842 and so on.

In addition, a slice header table 850 is generated by the outer loop CPU. The slice header table 850 includes slice information for each slice. For example, the information for the first slice is denoted by reference numeral 852, the information for the second slice is denoted by reference number 854, the information for the third slice is denoted by 856 and the information for the fourth slice is denoted by reference numeral 858 and so on, for example, to the information from tenth slice denoted by reference numeral 860.

Figure 9:
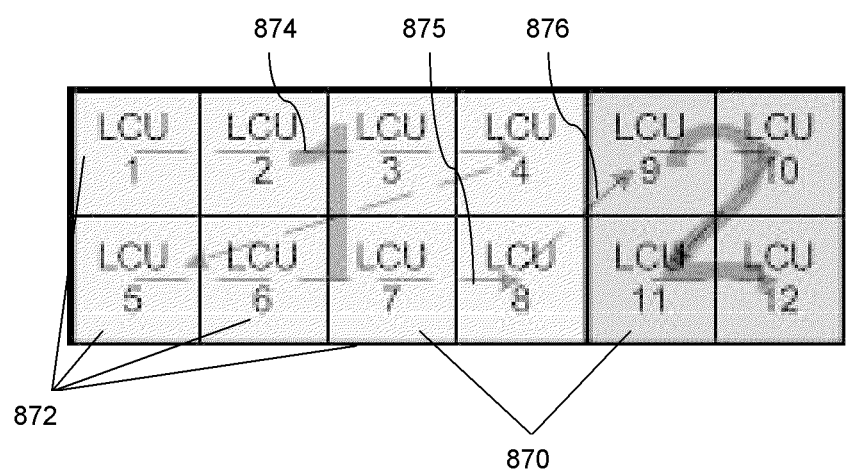
FIG. 9 is a two tile image with the encoding order indicated.

FIG. 9 is an illustration of an image including two tiles 870. Each tile is a subdivision of the image. Each tile 870 is includes one or more LCUs 872. The image may be processed across a row of the entire image in raster order and then the subsequent row scanned, and so on. However, the system may be implemented such that the LCUs in tiles are encoded in raster order within a tile, as denoted by line 874. Further, the tiles themselves are also processed in raster order, as denoted by lines 876

Figure 10:
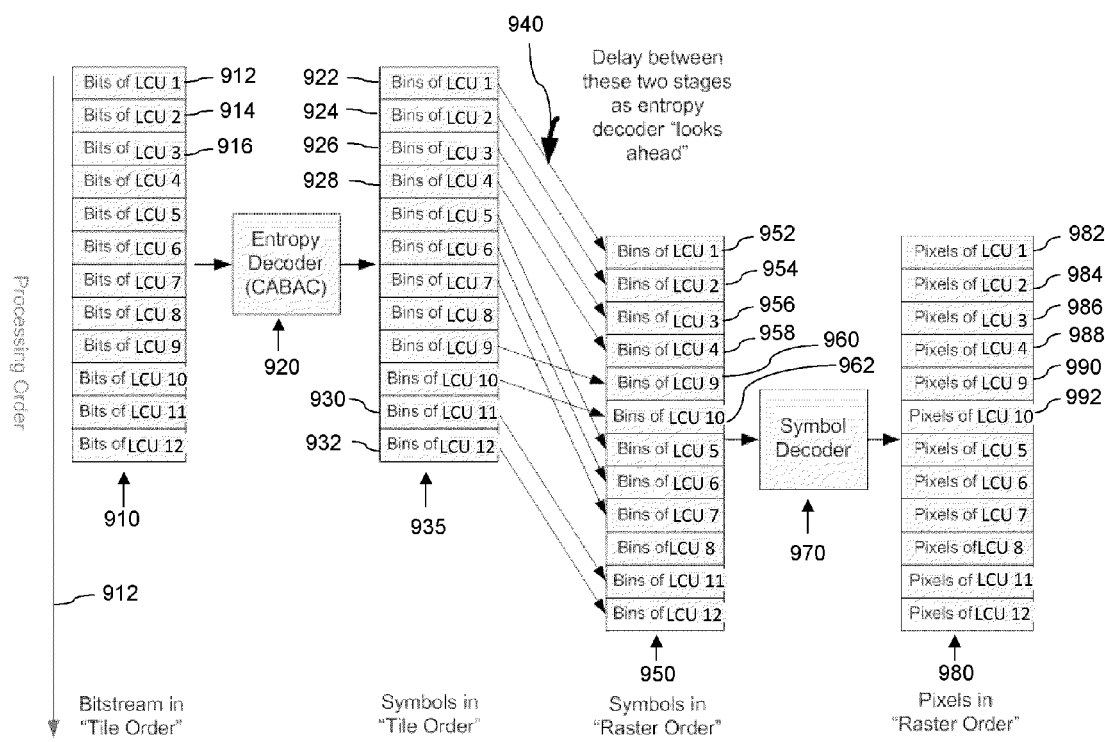
FIG. 10 is a diagram illustrating the process for switching from tile order to raster order for symbol decoding.

Now referring to FIG. 10, an illustration of the conversion from tile order to raster order for symbol conversion is provided. An array of coding unit bits is provided, as denoted by reference numeral 910. The processing order for each LCU (largest coding unit) is denoted by line 912. The bit stream in array 910 is provided in tile order and each element contains the bits for each coding unit. For example, a first element 912 corresponds to the bits for the first LCU, the second element 914 corresponds to the bits for the second LCU, the third element 916 corresponds to the bits for the third LCU, and so on. The array 910 is provided to the entropy decoder 920. The entropy decoder 920 generates an array 935 of the symbols in tile order. The array 935 includes a plurality of elements each containing the bins corresponding to a particular LCU. For example, element 922 corresponds to the bins for the first LCU, element 924 corresponds to bins for the second unit, element 926 corresponds to the bins for the third unit, element 928 corresponds to the bins for the fourth unit. In addition, it is noteworthy for this example that element 930 corresponds to the bins for the ninth LCU and element 932 corresponds to the bins for the tenth LCU. As denoted by arrow 940, there is a delay between the processing of array 935 and the processing of array 950 as the entropy decoder looks ahead.

Array 950 contains the symbols in a raster order. Accordingly, each element of array 950 corresponds to the bins of a particular LCU. However, in this case, the order to the elements may be rearranged to correspond to raster order rather than tile order. As such, element 952 corresponds to bins of the first LCU, element 954 corresponds to the bins of the second LCU, element 956 corresponds to the bins of the third LCU, element 958 corresponds to the bins of the fourth LCU. However, the fifth element denoted by reference number 960 corresponds to the bins of the ninth LCU and the sixth element 962 corresponds to the bins of the tenth LCU. From there, it may be noted that the next element corresponds to the bins of the fifth LCU and so on. As such, the array 950 can be provided to the symbol decoder 970 to generate a pixel array 980 in raster order. This allows the same symbol decoder to be used for the tiled and non-tiled images. As such, the pixels of the first LCU are contained in the first element, as denoted by reference numeral 982. Further, the second element 984 corresponds to the pixels of the second LCU, element 986 corresponds to the pixels of the third LCU, element 988 corresponds to the pixels of the fourth LCU, element 990 corresponds to the pixels of the ninth LCU, and element 992 corresponds to the pixels of the tenth LCU.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for decoding an image having a plurality of tiles, the method comprising:
    entropy decoding bit information to generate bin information, the bin information being in tile order;
    converting the bin information from tile order to raster order;
    symbol decoding bin information in raster order.
2. The method according to claim 1, wherein the tiles are assigned to tile rows and a tile row array output of the entropy decoder is non-contiguous.
3. The method according to claim 1, wherein the symbol decoding is delayed from the entropy decoding.
4. The method according to claim 1, wherein the symbol decoding fetches the next tile row while the present tile row is being processed.
5. The method according to claim 1, wherein the starting and ending slice numbers are stored.
6. The method according to claim 1, wherein the entropy decoding generates an array including a pointer to a start of a tile row bin buffer.
7. The method according to claim 1, wherein the entropy decoding generates an array including a length of a tile row bin buffer.
8. The method according to claim 1, wherein the entropy decoding generates an array including a slice number of a first LCU in a tile row.
9. The method according to claim 1, wherein the entropy decoding generates an array including a slice number of a last LCU in a tile row.
10. The method according to claim 1, wherein the entropy decoding generates an array including an error indicator.
11. A system for decoding an image having a plurality of tiles, the system comprising:
    an entropy decoder configured to receive bit information and generate bin information, the bin information being in tile order; the entropy decoder being configured to convert the bin information from tile order to raster order; a symbol decoder configured to receive bin information in raster order and generate pixel information.
12. The system according to claim 11, wherein the symbol decoder is decoupled from the entropy decoder.
13. The system according to claim 11, wherein entropy decoder comprises a context adaptive binary arithmetic coding (CABAC) engine.
14. The system according to claim 11, wherein a quantization parameter is calculated for a tile row and stored while a subsequent tile row is processed.
15. The system according to claim 11, wherein the entropy decoder generates an array including a pointer to a start of a tile row bin buffer.
16. The system according to claim 15, wherein the array is initially stored in tile order and is sorted into raster order.
17. The system according to claim 11, wherein the entropy decoder generates an array including a length of a tile row bin buffer.
18. The system according to claim 11, wherein the entropy decoder generates an array including a slice number of a first LCU in a tile row.

19. The system according to claim 11, wherein the entropy decoder generates an array including a slice number of a last LCU in a tile row.

20. The system according to claim 11, wherein the entropy decoder generates an array including an error indicator.

* * * * *